United States Patent [19]
Fedele

[11] Patent Number: 5,436,089
[45] Date of Patent: Jul. 25, 1995

[54] PORTABLE BATTERY PACK APPARATUS AND METHOD OF FABRICATION THEREOF

[75] Inventor: Vincent Fedele, Stow, Mass.

[73] Assignee: VST Power Systems, Inc., Concord, Mass.

[21] Appl. No.: 114,768

[22] Filed: Aug. 31, 1993

[51] Int. Cl.$^6$ .............................................. H01M 6/42
[52] U.S. Cl. ..................... 429/156; 429/159; 429/162; 29/623.4
[58] Field of Search ................ 429/156, 159, 162, 99, 429/177; 29/623.4

[56] References Cited

U.S. PATENT DOCUMENTS

| | | | |
|---|---|---|---|
| 1,501,084 | 7/1924 | Wright et al. | 429/156 |
| 1,747,757 | 2/1930 | Deibel | 429/159 X |
| 4,883,726 | 11/1989 | Peled et al. | 429/156 X |

*Primary Examiner*—Stephen Kalafut

[57] ABSTRACT

A battery pack is provided for housing a plurality of flat cells for portable electronic device applications. The battery pack is sufficiently thin to preserve the desirable thin profile of the flat cells and yet exhibits surprising structural integrity considering the relatively thin polycarbonate material from which the housing of the pack is fabricated. A plurality of thin cells is laterally arranged side by side in spaced-apart relationship to form a cell subassembly. An adhesive is applied to a polycarbonate sheet. The sheet is then cut to a predetermined form and embossed to form creases along predetermined fold lines. The prepared sheet is then folded at the fold lines and positioned to substantially surround the cell subassembly and form a box-like structure around such subassembly. Adhesive on an upper sheet section adheres to the top planar surfaces of the flat cells while adhesive on a lower sheet section adheres to the bottom planar surfaces of the flat cells. The upper and lower sheet sections formed by the boxlike folded sheet housing are substantially parallel with each other. In this member, the plurality of flat cells together with the parallel upper and lower sheet sections form a multiple I-beam structure which provides the battery housing with substantially structural integrity.

21 Claims, 8 Drawing Sheets

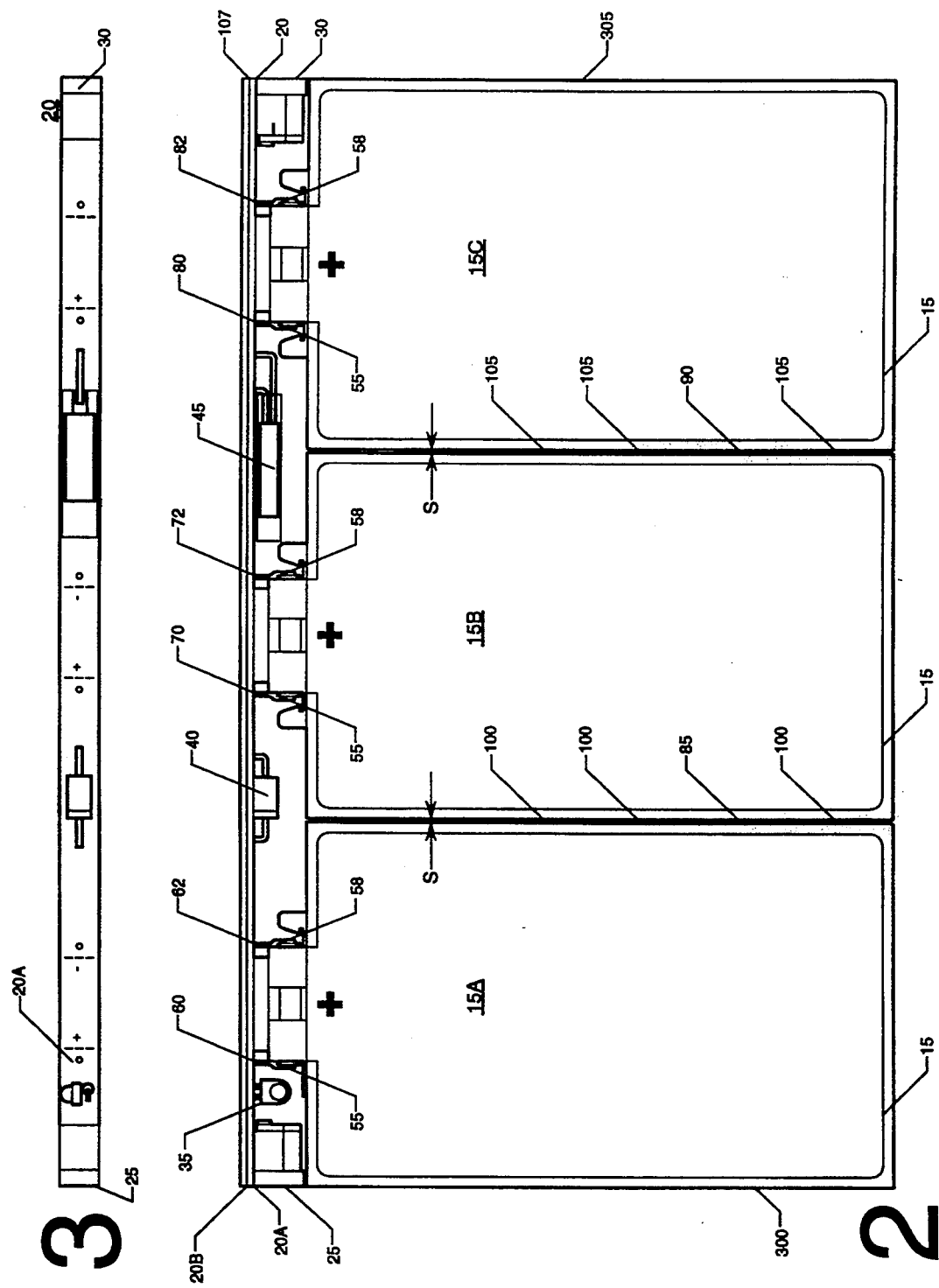

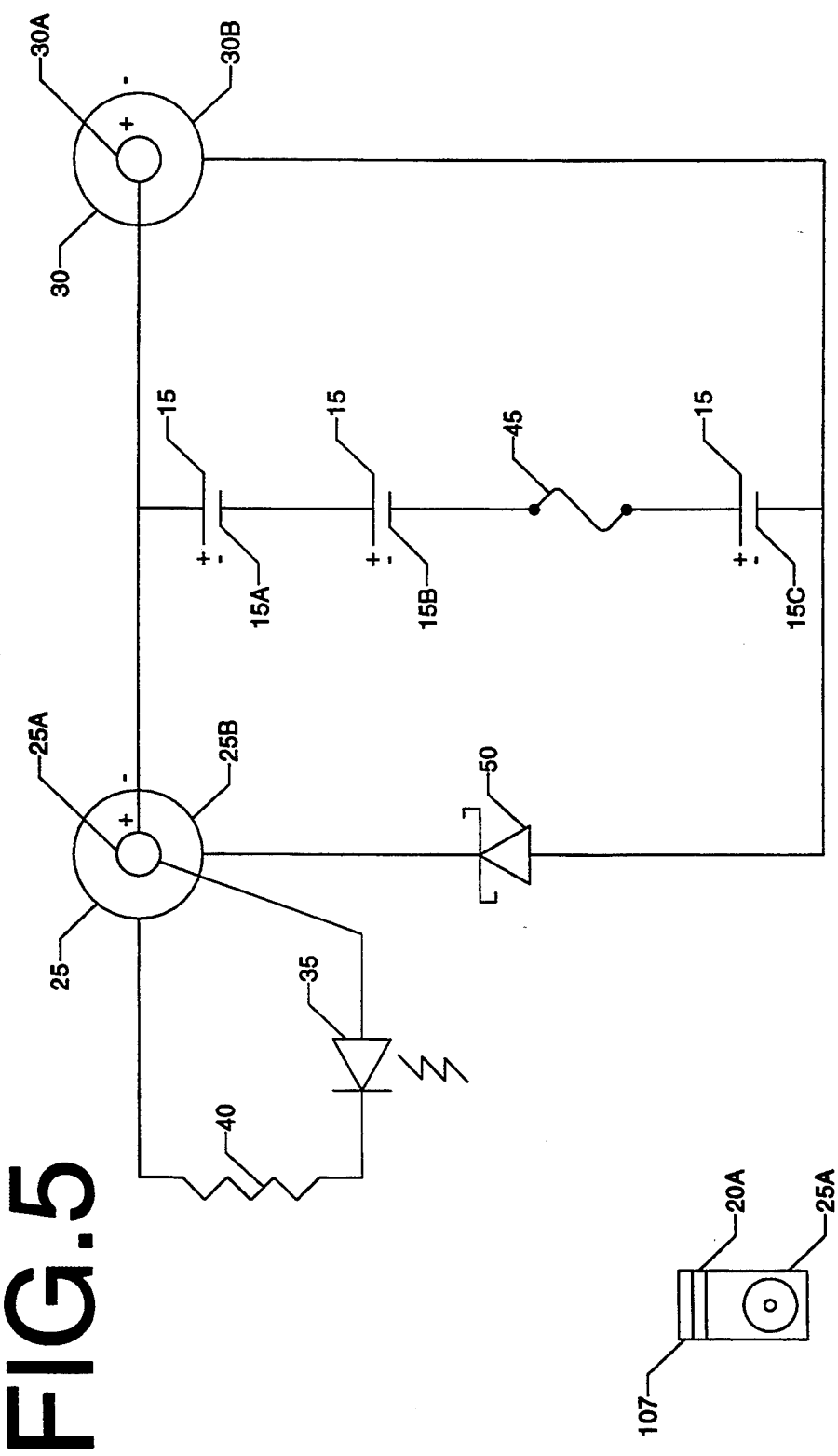

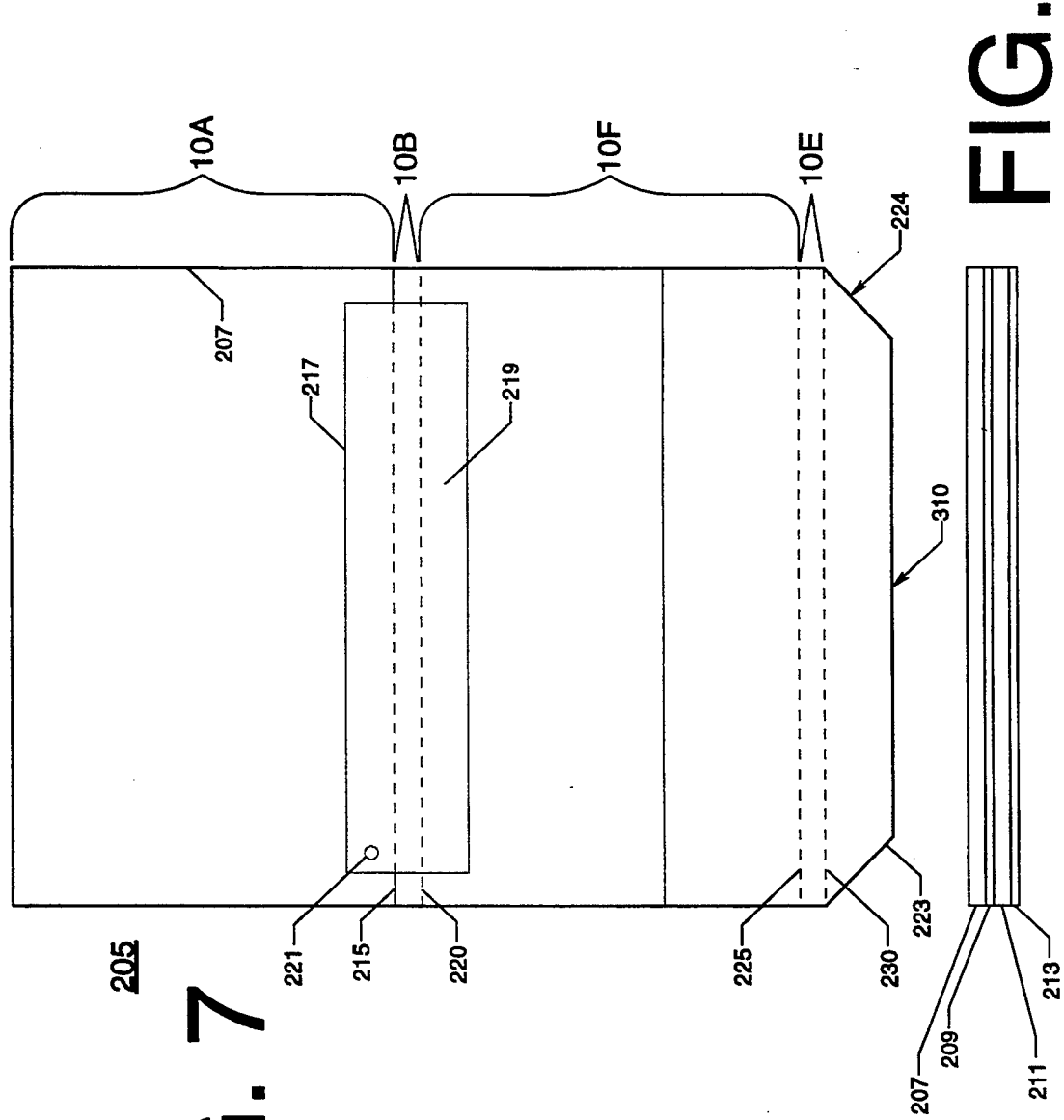

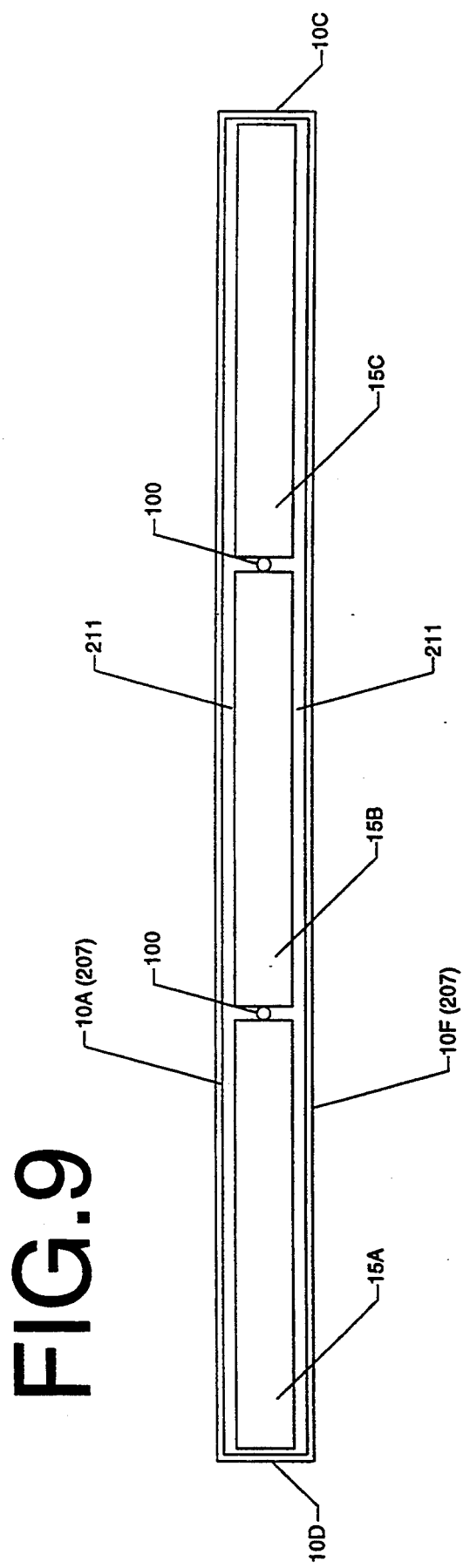

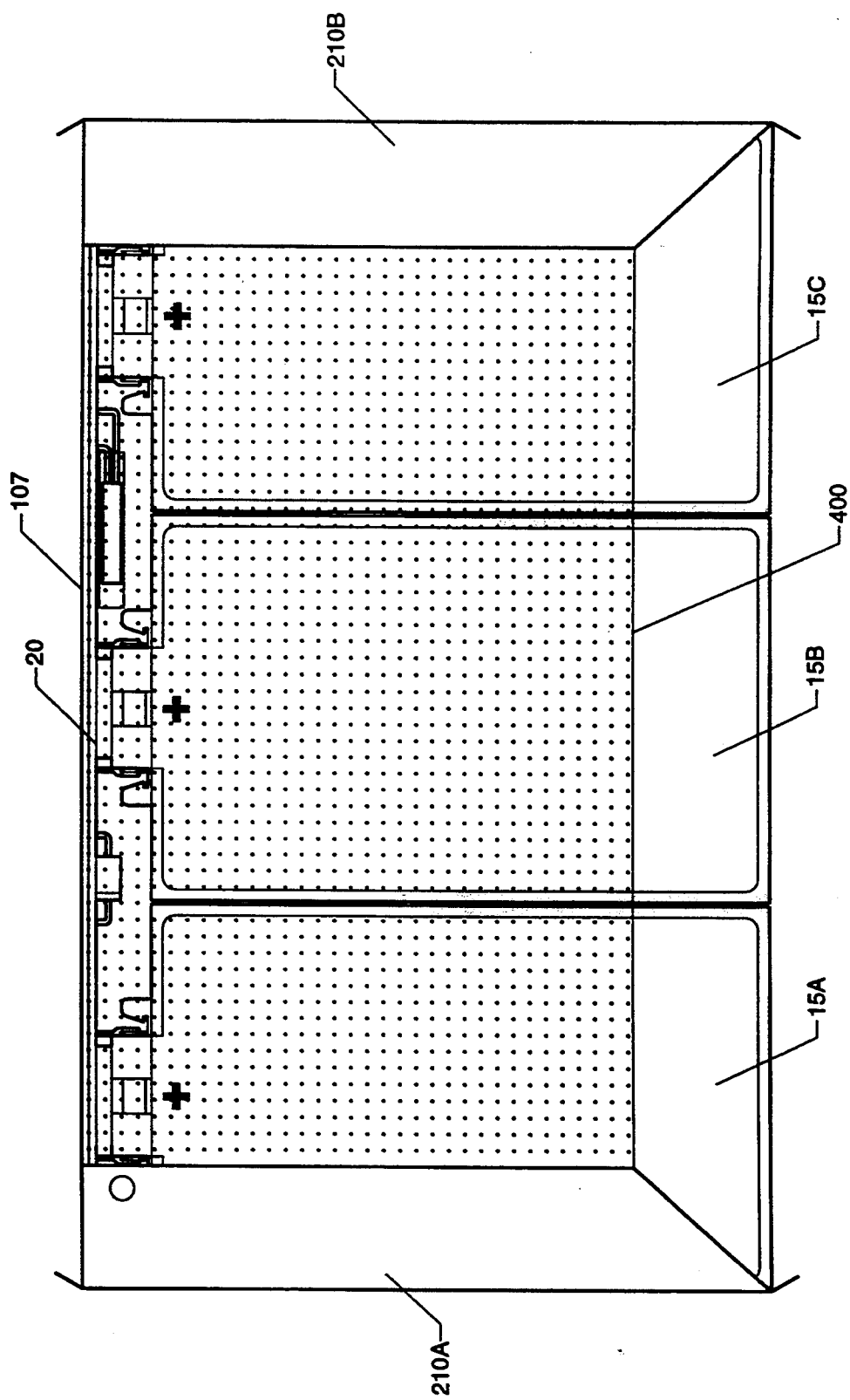

PORTABLE BATTERY PACK APPARATUS AND METHOD OF FABRICATION THEREOF

BACKGROUND OF THE INVENTION

This invention relates in general to battery housing structures, and more particularly, to battery housings and battery packs used by portable electronic devices.

Portable electronic devices, such as so-called laptop computers for example, by their nature require a portable source of power. Battery packs composed of either rechargeable or non-rechargeable cells provide such a portable source of power.

To reduce the total weight of battery packs which usually tend to be relatively heavy, it is desirable to make the housings for such battery packs of light-weight plastic materials. Although such light-weight plastic materials are desirable for battery housing applications due to their low weight, these plastic materials are also highly desirable due to their electrically insulative properties. Unfortunately however, when a battery housing fabricated from such a material is made relatively thin, the resultant battery housing often exhibits undesirably low structural integrity. Battery packs which exhibit low structural integrity are potentially dangerous and should be avoided in portable electronic applications.

Many portable battery packs are fabricated with parallelepided (rectangular-sided) housings divided into two halves, each half being formed from relatively thick injection molded thermoplastic materials such as ABS (acrylic butyl styrene) plastic and polycarbonate. Conventional cylindroidal voltaic cells are placed inside the rectangular housing of such a battery pack. The interior plastic walls of the housing are shaped to hold the cells. With a significant portion of the volume of the battery pack being taken up by the rectangular plastic housing itself and the open spaces between the cells, the energy density of such battery packs tends to be relatively low, whereas the weight of the structure tends to be relatively high. Another disadvantage of this battery housing arrangement is that the battery pack tends to be relatively easy to break and fracture upon dropping.

As discussed above, parallelepiped or rectangular battery housings are typically adapted for housing cylindroidally-shaped voltaic cells. However, with the advent of so-called "flat cells" (battery cells which exhibit a thin rectangular profile), a high strength, low weight battery housing for such cells becomes very desirable.

SUMMARY OF THE INVENTION

Accordingly, one object of the present invention is to provide a battery pack which exhibits high structural integrity.

Another object of the present invention is to provide a battery pack including a battery housing which is fabricated of relatively thin electrically insulative material.

Yet another object of the present invention is to provide a battery pack which is relatively light in weight.

Still another object of the invention is to provide a battery pack which is adapted for housing thin cells.

In accordance with one embodiment of the present invention, a battery pack is provided for a portable electronic apparatus. The battery pack includes a plurality of flat cells arranged in side-by-side relationship to form a cell group having a substantially uniform intercell spacing therebetween. Each cell includes an upper and lower major surface, the upper surfaces of the cells being aligned in a common upper plane, the lower surfaces of the cells being aligned in a common lower plane. The battery pack also includes a plastic sheet enclosure folded around the cell group to substantially surround the cells, the enclosure having an upper enclosure surface parallel with a lower enclosure surface. The battery pack further includes a first adhesive layer situated between and connecting the upper enclosure surface to the upper surfaces of the cells. The battery pack still further includes a second adhesive layer situated between and connecting the lower enclosure surface to the lower surfaces of the cells thus forming a substantially multi I-beam like structure which provides the structural integrity of the battery pack.

BRIEF DESCRIPTION OF THE DRAWINGS

The features of the invention believed to be novel are specifically set forth in the appended claims. However, the invention itself, both as to its structure and method of operation, may best be understood by referring to the following description and accompanying drawings.

FIG. 2 is a cross section of the battery pack of FIG. 1.

FIG. 3 is an side view of the printed circuit board employed in the battery pack of the invention.

FIG. 4 is an end view of the printed circuit board employed in the battery pack of the invention.

FIG. 5 is a schematic diagram of one recharger circuit which may be employed within the battery pack of the invention.

FIG. 7 is a side view of a sheet of material employed to fabricate the battery housing employed in the present invention.

FIG. 8 is a side profile showing the various layers employed in the battery housing.

FIG. 9 is another cross section of the battery pack of FIG. 1.

FIG. 11 is a view of an adhesive covered sheet which may be employed as an alternative way of holding the cells of the battery pack in position during fabrication.

DETAILED DESCRIPTION OF THE INVENTION

Figure 1:
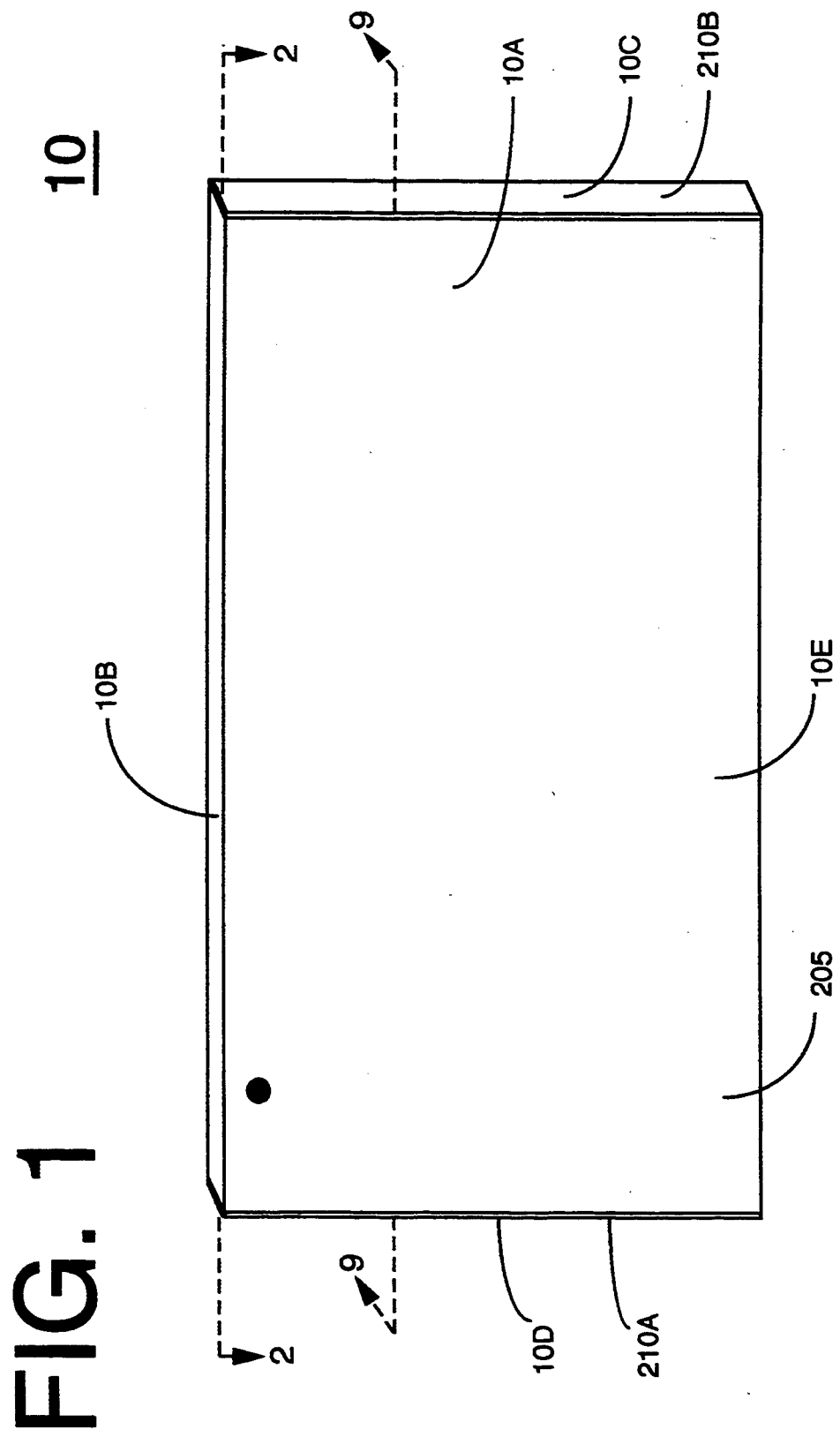
FIG. 1 is a front perspective view of the battery pack apparatus of the present invention.

FIG. 1 is a front perspective view of battery pack 10 of the present invention. Battery pack 10 exhibits a substantially parallelepiped shape with rectangular sides. In FIG. 1, front side 10A, top side 10B and right side 10C are visible. Left side 10D and bottom side 10E are partially visible. The back side 10F of battery pack 10 is not visible in this view.

FIG. 2 is a cross-sectional view of battery 10 of FIG. 1 taken along section line 2—2 to reveal the interior of battery 10. Battery 10 includes a plurality of voltaic cells 15. For example, in this particular embodiment, three cells are employed. This number of cells is only given for purposes of illustration and should not be taken as being limiting. Cells 15 are flat cells such as the THINLINE ® Energy Cell manufactured by Portable Energy Products, Inc. In this particular embodiment, three 2 volt cells arranged in series are employed as cells 15 although other voltage cells could be used as well depending on the particular application. Battery 10 thus exhibits a 6 volt potential with 5.0 Ah energy storage capability.

Cells 15 are fixedly mounted to an elongated rectangular printed circuit board 20. An edge or side view of printed circuit board 20 is shown in FIG. 2. For clarity, a top view of printed circuit board 20 is included as FIG. 3. The top of board 20 is designated as top 20A and is visible in FIG. 3. The bottom of board 20 is designated as bottom 20B and although not visible in FIG. 3, board bottom 20B is the leaded side of board 20 and is shown in FIG. 2.

Board 20 includes recharging circuitry for charging cells 15. The recharging circuitry of board 20 includes a power input receptacle 25 to which a source of direct current voltage (approximately 6 volts ) is supplied for recharging cells 15. The circuitry of board 20 also includes a power output receptacle 30 to which the direct current voltage (approximately 6 volts ) produced by the recharging circuit is provided. The same type of power receptacle may be employed as receptacles 25 and 30 as shown in FIG. 3.

FIG. 4 shows an end view of circuit board 20 after being populated with receptacle 25 and other components.

One recharging circuit which may be placed on board 20 to recharge cells 15 is shown schematically in FIG. 5. As shown in FIG. 5, the recharging circuit includes a light emitting diode (LED) 35 coupled via a 330 ohm resistor 40 to input receptacle 25 to give an indication of when battery 10 is plugged into a source of DC power. As a convenience to the user, when the battery is plugged into a DC power source for charging purposes, LED 35 turns on and emits light. More particularly, the anode of LED 35 is coupled to the positive terminal 25A of receptacle 25 and the cathode of LED 35 is coupled via resistor 40 to the negative terminal 25B of receptacle 25.

The positive terminal 25A of input receptacle 25 is coupled to the positive terminal 30A of receptacle 30. For ease of discussion, the three cells 15 in battery 10 are now designated separately as cells 15A, 15B and 15C. The positive terminal of cell 15A is coupled to the negative terminal 25B of receptacle 25 and to negative terminal 30B of receptacle 30. The negative terminal of cell 15A is coupled to the positive terminal of cell 15B. The negative terminal of cell 15B is coupled via a thermal circuit breaker 45 to the positive terminal of cell 15C. Should excessive amounts of current ever be drawn from cells 15, as in the case of a short circuit external to output connector 30 or as in the case of an internal battery short circuit, then breaker 45 opens and battery current flow ceases. A low voltage drop, snap-action bimetallic strip type thermal breaker is one type of breaker which may be employed as breaker 45.

The negative terminal of cell 15C is coupled to the negative terminal of output receptacle 30. The negative terminal of cell 15C is also coupled via a Schottky diode 50 to the negative terminal 25B of input receptacle 25. Diode 50 prevents current from flowing through cells 15 should the supply of voltage to input receptacle 25 somehow be backwards, that is, reversed biased. Damage to cells 15 is thus prevented in the case of a backwards input supply voltage connection.

Battery pack 10 is fabricated in the following manner. With the exception of the mounting of cells 15 on circuit board 20, circuit board 20 is fabricated with the recharging circuit of FIG. 5 thereon using conventional printed circuit board layout, population and final assembly techniques.

It is important to the invention that cells 15 are situated in substantially uniform spaced-apart relationship as seen in FIG. 2 which is approximately to scale. In one embodiment of the invention, a spacing, S, of 0.020 inches between cells was found to be suitable, although greater or lesser amounts of spacing than this can be employed as long as the cells are relatively closely spaced. The purpose of this spacing is to allow for tolerance variations in the dimensions of the battery cells. Flat cells are typically fabricated from two halves which are ultrasonically welded together. When the weld is formed, undesired flashings often result at the side edges of the flat cells where the two halves come together. These flashings are one cause of flat cell dimensional variations.

It has been found that the spacing, S, could be reduced to zero if thin cells with perfect dimensions were employed, that is, wherein there is no lateral dimensional variation from cell to cell. Generally, the spacing S is in the range of zero to approximately 0.04 inches with the aforementioned spacing, S, of approximately 0.02 inches being employed in the preferred embodiment of the invention.

One approach which has been found to be suitable for obtaining the desired intercell spacing, S, is to arrange cells 15 in side-by-side relationship as seen in FIG. 2. (Before discussing the approach in detail it is first noted that cells 15 each include terminals 55 and 58 which serve as mounting terminals as well as electrical current carriers.) Circuit board 20 includes mounting holes (not visible in FIG. 2) at locations 60, 62 (for cell 15A), 70, 72 (for cell 15B) and 80, 82 (for cell 15C). The mounting holes at location 60, 62 receive mounting terminals 55, 58 respectively of cell 15A. The mounting holes at location 70, 72 receive mounting terminals 55, 58 respectively of cell 15B. The mounting holes at location 80, 82 receive mounting terminals 55, 58 respectively of cell 15C.

The mounting hole pair at locations 60, 62 is spaced with respect to the mounting hole pair at location 70, 72 so that the desired spacing, S, between cell 15A and 15B is approximately obtained when cells 15A and 15B are mounted to circuit board 20 by soldering the terminals of such cells to circuit board metal lands at their respective circuit board holes. Similarly, the mounting hole pair at location 70, 72 is spaced with respect to the mounting hole pair at location 80, 82 so that the desired spacing, S, between cell 15B and 15C is approximately obtained when cells 15B and 15C are mounted to circuit board 20 by soldering the terminals of such cells to circuit board metal lands at their respective circuit board holes.

To precisely obtain the intercell spacing, S, between cell 15A and 15B, and between 15B and 15C, a metal blade (not shown) or temporary spacer exhibiting a width, S, is situated between cell 15A and 15B at location 85. Another identical blade is situated between cell 15B and 15C at location 90 to calibrate the desired intercell spacing between those two cells.

With both blades in position, an adhesive such as Five Minute Epoxy, Devcon Part No. 14250, is applied at one or more locations 100 between cells 15A and 15B. Similarly, the same adhesive is applied at one or more locations 105 between cells 15B and 15C as shown.

When the adhesive dries, cell 15A is held at the desired intercell spacing, S, with respect to cell 15B and cell 15B as also held at the desired intercell spacing with respect to cell 15C. The blades between the cells are now removed. The completed cell subassembly thus formed is what is depicted in FIG. 2. That assembly measures approximately 5⅝ inches by 9⅜ inches in this particular embodiment.

It is noted that maintaining intercell spacing, S, helps to assure the squareness or rectangularness of the resultant battery pack. While the intercell spacing, S, is maintained at the top of cells 15 by the spacing between the mounting hole pairs in board 20 into which cells 15 are mounted, at the same time the intercell spacing, S, is temporarily maintained at the bottom cells 15 by the spacer blades therebetween. Stated alternatively, cells 15 exhibit a substantially uniform intercell spacing. In other words, the intercell spacing at the top of the cells is substantially the same as the intercell spacing at the bottom of the cells. This assures that cells 15 are substantially parallel with respect to each other and further assures the rectangularity of the resultant battery pack.

Figure 6:
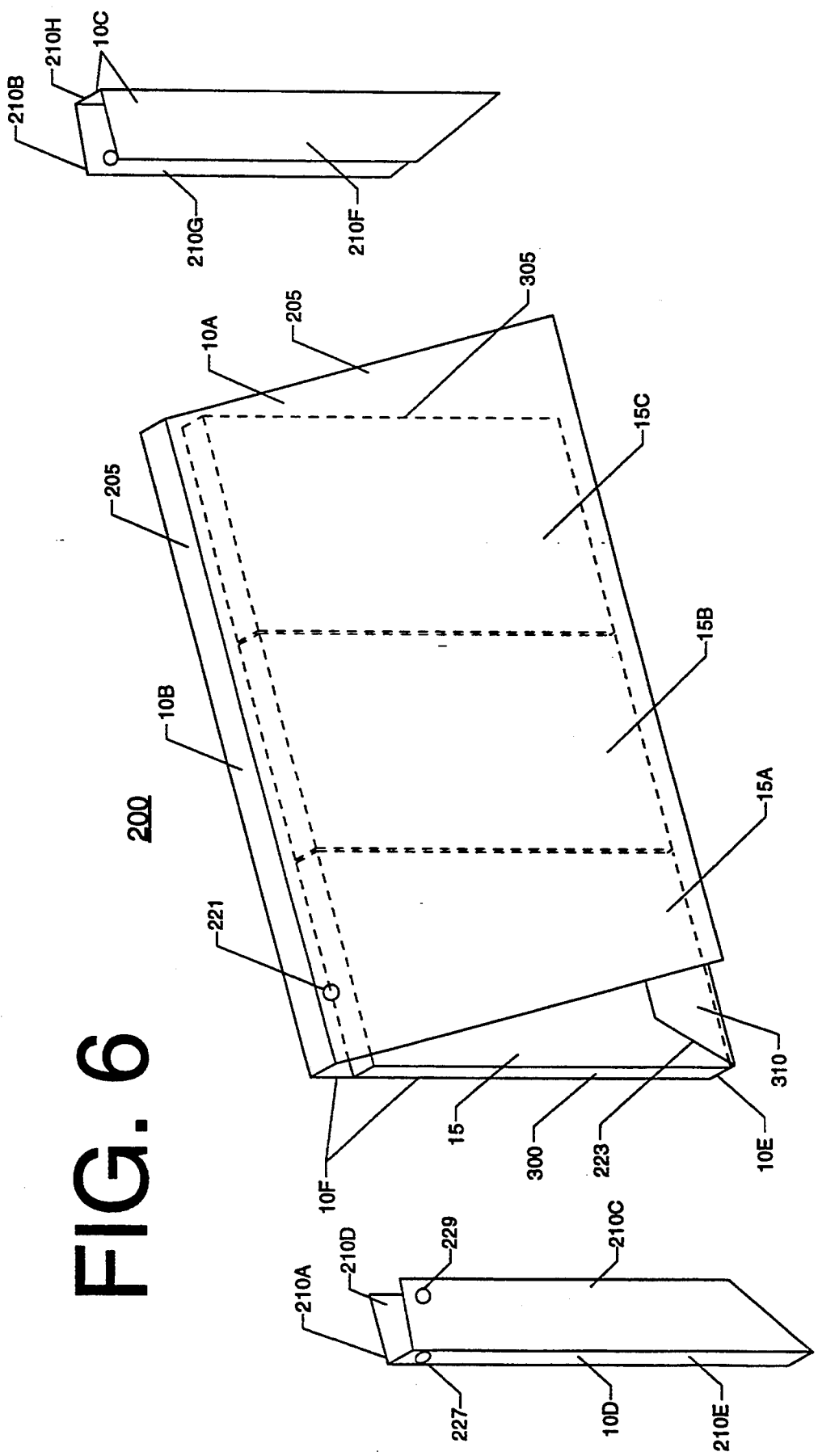
FIG. 6 is a perspective representation of the main housing and housing end pieces of the battery pack.

The subassembly of FIG. 2 is now taken and moved to a location within a foldable housing 200 which includes main housing 205 and a pair of housing end pieces 210A and 210B as shown in FIG. 6 which is drawn approximately to a 1:2 scale. Before proceeding with a discussion of the final assembly of the subassembly of FIG. 2 into housing 200 to complete battery pack 10, a discussion of the fabrication of housing 200 will follow.

Housing 200 is fabricated from polycarbonate material which in this particular embodiment is approximately 0.015 inch thick. As seen in FIG. 6, main housing 205 is folded at a number of locations (lines) subsequently described to form the housing structure shown. Prior to this folding operation, housing 205 is formed from a sheet 207 of polycarbonate which is cut to a configuration, such as indicated in the example of FIG. 7, which when folded will substantially surround the completed cell subassembly of FIG. 2 and form a substantially box-like enclosure therefor. In this particular embodiment of the invention, sheet 207 is clear polycarbonate, although other applications are possible in which the polycarbonate is a colored sheet. When a clear polycarbonate sheet is employed as sheet 207, as in this example, various logos and text information may be stencilled onto the sheet to identify and distinguish the resultant battery structure.

As seen in FIG. 8, a number of different ink and adhesive layers are built up on sheet 207 to form main housing 205 as will now be described. An ink layer 209 (approximately 0.002 in. thick) having one or more colored portions of logo or text information is situated on polycarbonate layer 207. Since polycarbonate layer 207 is clear, it acts as a window through which the inked logo or text information of ink layer 209 may be viewed when the battery is assembled. A layer of adhesive 211, for example 468MP Hi Performance adhesive from 3M Corp. which is approximately 0.005 inch thick is then laminated under pressure onto sheet 207 as shown in FIG. 8. A protective layer 213 of very thin release paper covers adhesive prior to folding of sheet 207 and final assembly. The release paper employed for protective layer 213 is sufficiently thin to permit relatively easy bending and folding of the polycarbonate sheet on which it is disposed. More particularly, in the present embodiment the invention, release paper 213 is approximately 4 mils (.004 inches) in thickness.

As shown in FIG. 7, the central region of sheet 207 within rectangle 217 includes no adhesive or protective paper layer. An adhesive-free zone 219 is thus created for the purpose of permitting cells 15 to safely vent to the environment. Without this adhesive—free zone, the battery pack would be completely sealed and could not properly vent to the ambient.

It is also noted that a circular ink-free region 221 is situated within adhesive free zone 219 to permit the light from LED 35 to shine through when battery 10 is completely assembled. It is still further noted that the lowermost corners of housing 205 in FIG. 7 are cut at approximately 45 degree angles as shown. Angled portions 223 and 224 are thus formed in housing 205.

At this point, the main housing 205 depicted in FIG. 7 has been fabricated from the above-described layers. Main housing 205 is presently flat. To form main housing 205 into the folded box-like structure of FIG. 6, main housing 205 is first embossed at fold lines 215, 220, 225 and 230 to form creases at those fold lines exhibiting a depth of approximately 0.003 inches in one embodiment. Then, after main housing 205 is so embossed, housing 205 is bent or folded along each of fold lines 215, 220, 225 and 230 to form an approximate right angle at each of the fold lines thus producing the folded main housing 205 depicted in FIG. 6. It is noted that the layered polycarbonate sheet of FIG. 8 is preferably cut to the size and configuration of FIG. 7 simultaneously with the above described embossing operation which creates the creases at fold lines 215, 220, 225 and 230. A die/press having both cutting knives and creasing knives can be used to cut the perimeter of main housing 205 and to emboss fold lines 215, 220, 225 and 230 to form the above-described creases therein.

Once the creases are formed at fold lines 215, 220, 225 and 230, the layered polycarbonate sheet can be folded without forming undesirable craving lines in the polycarbonate. The term "craving lines" refers to the white lines which typically form when polycarbonate is bent. Such craving lines are the precursor to fractures in the polycarbonate and ultimately breakage of the polycarbonate. Such craving lines are advantageously avoided by the embossing approach described above.

Returning momentarily to FIG. 7, it is seen that after the embossing and folding steps described above, housing 205 is divided into folded portions which correspond to front 10A, top 10B, back 10F and bottom 10E of battery pack 10 of FIG. 1. A comparison of FIG. 1 and FIG. 7 facilitates an understanding of how battery pack 10 is formed.

Figure 10:
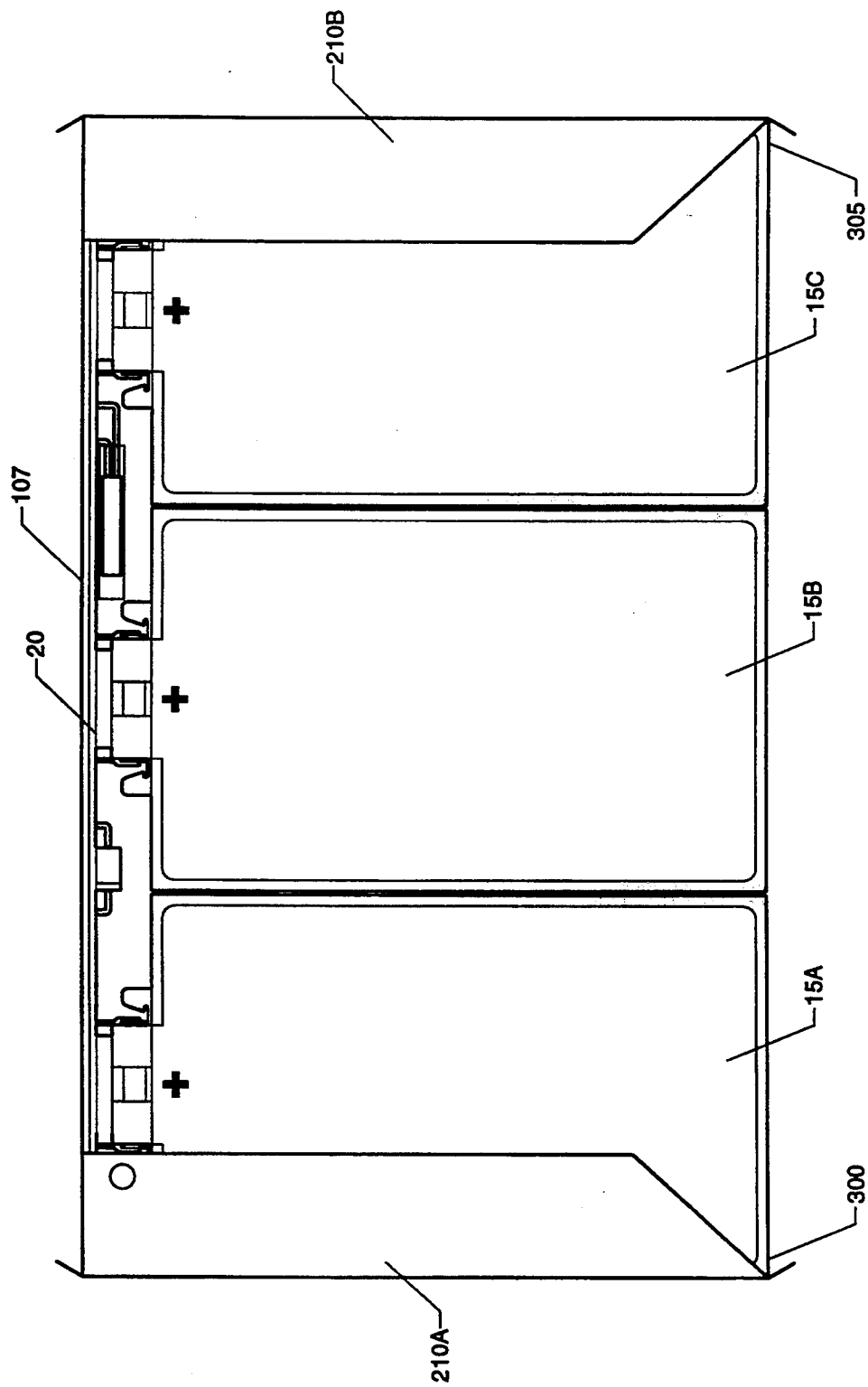
FIG. 10 is a front view of a multi-cell battery subassembly with end pieces mounted thereon.

Housing end pieces 210A and 210B of FIG. 6 are formed by the same polycarbonate sheet, ink layer, adhesive layer, protective paper layer process described above. As seen in FIG. 6, end pieces 210A and 210B are substantially U-shaped. End piece 210A includes front and back surfaces 210C and 210D, respectively, and a side surface 210E which joins front and back surfaces 210C and 210D at respective fold lines as shown. The folds in housing end pieces 210A and 210B are created by the same embossing/creasing technique described above. Housing end pieces 210A and 210B are dimensioned to fold around the respective opposed lateral ends 300 and 305 of the cell subassembly of FIG. 2. FIG. 10 shows the cell subassembly after end pieces 210A and 210B are mounted thereon.

It is noted that, as seen in FIG. 6 and FIG. 10, the lowermost portion of end piece 210A is angled at 45 degrees to meet with angled portion 223 of main housing 205 when the battery is finally assembled. End piece 210B includes front and back surfaces 210F and 210G, respectively, and a side surface 210H which joins front and back surfaces 210F and 210G. The lowermost portion of end piece 210B is likewise angled at 45 degrees to meet with angled portion 224 of main housing 205 when the battery is finally assembled.

End piece 210A includes a circular opening 227 which aligns with input receptacle 25 when the battery is assembled. End piece 210B has a sin-tilar opening (also designated 227, but which is not visible in FIG. 6) for aligning with output receptacle 30 when the battery is assembled. End piece 210A includes another opening 229 which aligns with the clear ink-free region 221 of housing 205 when the battery is assembled. Light from LED 35 is thus able to shine through ink-free region 221 and opening 229 when battery 10 is plugged into a DC power source. Housing end pieces 210A and 210B are conveniently substantially identical.

To complete the assembly of battery 10 once the cell subassembly of FIG. 2 and main housing 205, together with housing end pieces 210A and 210B are prepared as described above, the following steps are taken. The completed cell subassembly of FIG. 2, which includes opposed ends 300 an 305, is now equipped with housing end pieces 210A and 210B as shown in FIG. 6 and more clearly in FIG. 10. More particularly, the protective paper is removed from the adhesive layer on housing end piece 210A and housing end piece 210A is then affixed to battery subassembly end 300. (See FIG. 2, 6 and 10) Side surface 10D of housing end piece 210A attaches to end 300 and hole 227 aligns with receptacle 25. In a similar manner, the protective paper is then removed from the adhesive layer on housing end piece 210B and housing end piece 210B is then affixed to battery subassembly end 305. Side surface 10C of housing end 210B attaches to end 305 and opening 227 (not visible in FIG. 6) of end piece 210B aligns with receptacle 30. The adhesive on end pieces 210A and 120B hold these end pieces to subassembly ends 300 and 305.

The battery subassembly with end pieces 210A and 210B is now installed in main housing 205 as shown in FIG. 6. More particularly, protective paper layer 213 layer is peeled off the inner surface of main housing 205 leaving the folded housing 205 shown in FIG. 6. Housing 205 is folded around the cell subassembly to form a substantially box-like structure. More particularly, the front side or flap 10A of housing 205 is flipped up momentarily to permit the completed cell subassembly of FIG. 2 (with end pieces as shown in FIG. 10) to be positioned within main housing 205 as shown in FIG. 6. Opposed battery ends 300 and 305 are aligned adjacent the edges of main housing 205 as illustrated.

The backs of the three cells 15A, 15B and 15C adhere to the exposed adhesive on the interior back side 10F of main housing 205. The lower flap 310 of main housing 205 is flipped up and adheres to the front of the three cells along their lowermost portion. The front side or front flap 10A is then pressed down onto the front of the three cells and adheres to those cells. The completed battery pack structure 10 of FIG. 1 is thus formed.

Returning momentarily to FIG. 2 and FIG. 4 it is noted that in actual practice a protective layer of foam 107 is glued to the side of circuit board 20 facing away from cells 15. This protects the battery housing from leads that may extend from the board 20 which might otherwise contact the interior of the battery housing. Damage to the ink layers on the battery housing is thus avoided. Moreover, foam 107 aids in compensating for any tolerance variations between circuit board 20 and housing top side 10B.

Returning again to FIG. 1, it is noted that main housing 205 is laterally dimensioned such that it does not fully overlap end pieces 210A and 210B. This assures that main housing 205 does not laterally extend beyond the end pieces and thus avoids the potential creation of a sharp edge which might be annoying to a user.

FIG. 9 provides a cross-sectional view of battery pack 10 of FIG. 1 taken along section line 9—9 so that the source of the structural integrity of battery pack 10 can be appreciated. It is seen that the upper surfaces of all three cells 15A, 15B and 15C are fixedly held to polycarbonate housing front side or flap 10A by adhesive layer 211 therebetween. Similarly, the bottom surfaces of all three cells are held to polycarbonate housing back side 10F by adhesive layer 211. Thus, housing front side 10A is held in substantially parallel relationship with housing back side 10F by adhesive layer 211 and cells 15 therebetween. A multi I-beam-like structure is thus formed with very substantial structural integrity. It is noted that, as seen in FIG. 9, the end pieces 10C (210B) and 10D (210A) and the adhesive layer thereof also contribute to this I-beam-like structure. In FIG. 9, the cells 15A, 15B and 15C act as the vertical part of the I-beam (or triple I-beam in this case). The housing front side 10A, in parallel with the housing back side 10F, act together as the horizontal members of the I-beam-like structure. The housing front side 10A is structurally connected to housing back side 10F in three significant places, namely at the major opposed plane pairs formed where the cells meet the housing front side 10A and the housing back side 10F. This arrangement surprisingly provides a very large amount of structural integrity from a relatively thin housing material which is normally rather flimsy when thin.

While the embodiment depicted in FIG. 2 is a triple I-beam-like structure since three cells 15 are employed, it will be appreciated that the same battery fabrication technique described above is readily employed to fabricate battery packs having two or more cells 15. When two cells are used, a double I-beam structure is achieved. When four cells are used, a quadruple I-beam structure results.

It is noted that the positioning adhesive used at locations 100 depicted in FIG. 2 to hold cells 15 in place at intercell spacing, S, is also shown here in FIG. 9 at locations 100. It is further noted that this adhesive serves the purpose of a positioning adhesive and does not contribute significantly to the structural integrity of battery pack 10. Rather, the I-beam like structure described above is believed to provide most of the structural strength of the battery pack.

As an alternative to the positioning adhesive at locations 100, adhesive tape stretched across cells 15 may be used to hold cells 15 in position prior to final assembly.

Another alternative to the positioning adhesive situated at locations 100 is to employ a connective sheet 400 of polycarbonate measuring approximately 7.2 inches by approx 4.5 inches and approximately 0.015 inches thick as seen in FIG. 11. In other words, connective sheet 400 is dimensioned to fit between end pieces 210A and 210B. Connective sheet 400 is outfitted with the same adhesive layer and release paper layer that was employed for main housing 205. To attach connective sheet 400 to cells 15A, 15B and 15C, the release paper layer is first removed. Connective sheet 400 is then placed on cells 15 as shown so as to extend across all three cells 15 to hold cells 15 in position in square, spaced, parallel relationship prior to final assembly of battery 10, namely, prior to placement of the subassembly of FIG. 11 into main housing 205. As seen in FIG. 11, connective sheet 400 extends from approximately 1 inch from the bottoms of cells 15 to the top of printed circuit board 20 but not onto foam 107. As already mentioned, connective sheet extends between end pieces 210A and 210B. Once the subassembly of FIG. 11 is completed, final assembly of battery pack 10 can proceed as described earlier.

While the above description sets forth a battery pack apparatus which exhibits high structural integrity, it is clear that a method of fabricating the battery pack is also disclosed. More particularly, a method of manufacturing a battery pack from a plurality of flat cells is disclosed. Each cell includes upper and lower major surfaces and is situated in side-by-side relationship in a cell subassembly. The method includes the steps of forming a layer of adhesive on a plastic sheet. The method also includes the step of embossing the sheet along a plurality of lines on the sheet to form a plurality of creased fold lines in the sheet. The method further includes the step of folding the sheet around the cell subassembly to form a box-like structure which substantially surrounds the cell subassembly.

Another embodiment of the method of the invention includes the step of situating the cells in side-by-side relationship to form a cell subassembly exhibiting a substantially uniform spacing between the cells. Again, the upper surfaces of the cells are aligned in a common upper plane and the lower surfaces of the cells are aligned in a common lower plane. The method also includes the step of forming a layer of adhesive on a major surface of a plastic sheet which will be designated as the adhesive surface of the sheet. The method further includes the step of cutting the plastic sheet to a form that will substantially surround the cell subassembly when folded around the cell subassembly. The method still further includes the step of embossing the sheet to form a plurality of creased fold lines in the sheet. The method also includes the step of folding the sheet at the fold lines around the cell subassembly to form an enclosure which substantially surrounds the cell subassembly and which includes substantially parallel adhesive-covered upper and lower sheet section surfaces which face each other. In this manner, the adhesive-covered upper sheet section surface adheres to the upper major surfaces of the cells and the adhesive-covered lower sheet section surface adheres to the lower major surfaces of the cells, thus forming a battery pack exhibiting a substantially I beam-like structure which provides significant structural integrity.

The foregoing has described a battery pack which exhibits high structural integrity and which includes a housing fabricated of relatively thin electrically insulative plastic material. The battery pack is advantageously relatively light in weight and thin in profile and form factor. The battery pack is desirably adapted for housing thin cells. More particularly, the invention provides a very unique way of maintaining the thin form factor of thin cells.

While only certain preferred features of the invention have been shown by way of illustration, many modifications and changes will occur to those skilled in the art. For example, while in the preferred embodiment, a polycarbonate sheet was employed to fabricate the battery housing, other plastic sheet materials such as polyester, vinyl and ABS (acrylic butyl styrene) may be employed as well. It is, therefore, to be understood that the present claims are intended to cover all such modifications and changes which fall within the true spirit of the invention.

What is claimed is:

1. A battery pack for a portable electronic apparatus, said battery pack comprising:
    a plurality of flat cells arranged in side-by-side relationship to form a cell group having a substantially uniform and substantially adhesive free intercell spacing therebetween, each cell having an upper and lower major surface, the upper surfaces of said cells being aligned in a common upper plane, the lower surfaces of said cells being aligned in a common lower plane;
    a plastic sheet enclosure folded around said cell group to substantially surround said cells, said enclosure including an upper sheet surface parallel with a lower sheet surface;
    a first adhesive layer situated between and connecting said upper sheet surface to the upper surfaces of said cells; and
    a second adhesive layer situated between and connecting said lower sheet surface to the lower surfaces of said cells thus forming a substantially I-beam like structure which provides the structural integrity of said battery pack;
    at least one of the upper and lower sheet surfaces being directly adhesively coupled to said cells.

2. The battery pack of claim 1 wherein said spacing between cells is the range of zero to approximately 0.04 inches.

3. The battery pack of claim 1 further comprising a connective positioning sheet adhesively coupled to the upper surfaces of said cells to hold said cells spaced apart with a substantially uniform intercell spacing therebetween.

4. The battery pack of claim 1 wherein said enclosure includes a plurality of crease lines at which said enclosure is folded to form a boxlike structure.

5. The battery pack of claim 1 wherein said enclosure includes a plurality of embossed crease lines at which said enclosure is folded to form a boxlike structure.

6. The battery pack of claim 1 wherein said flat cells exhibit a substantially parallelepiped shape.

7. The battery pack of claim 1 wherein said plastic sheet enclosure is fabricated from polycarbonate.

8. The battery pack of claim 1 wherein said plastic sheet enclosure is fabricated from polyester.

9. The battery pack of claim 1 wherein said plastic sheet enclosure is fabricated from vinyl.

10. The battery pack of claim 1 wherein said plastic sheet enclosure is fabricated from ABS plastic.

11. A method of manufacturing a battery pack from a plurality of flat cells, each cell including upper and lower major surfaces and being situated in side-by-side relationship in a cell subassembly, said method comprising the steps of:
    forming a layer of adhesive on a plastic sheet;
    embossing said sheet along a plurality of lines on said sheet to form a plurality of creased fold lines in said sheet, said embossing step forming front and back sheet surfaces in the sheet; and folding said sheet around said cell subassembly to form a box-like structure which substantially surrounds said subassembly, at least one of the front and back surfaces of the sheet being directly adhesively coupled to the cells by said layer of adhesive.

12. The method of claim 11 including the step of cutting said sheet to dimensions which form said box-like structure when said sheet is folded in said folding step.

13. The method of claim 11 wherein said plastic sheet is fabricated from material from the group consisting of polycarbonate, polyester, vinyl and ABS plastic.

14. A method of manufacturing a battery pack from a plurality of flat cells, each cell including upper and lower major surfaces, said method comprising the steps of:
 situating said cells in side-by-side relationship to form a cell subassembly exhibiting a substantially uniform sparing between said cells, the upper surfaces of said cells being aligned in a common upper plane, the lower surfaces of said cells being aligned in a common lower plane;
 forming a layer of adhesive on a major surface of a plastic sheet which will be designated as the adhesive surface of said sheet;
 cutting said plastic sheet to a form that will substantially surround said cell subassembly when folded around said cell subassembly;
 embossing said sheet to form a plurality of creased fold lines in said sheet; and
 folding said sheet at said fold lines around said cell subassembly to form an enclosure which substantially surrounds said cell subassembly and which includes substantially parallel adhesive-covered upper and lower sheet section surfaces which face each other, such that said adhesive-covered upper sheet section surface adheres directly to the upper major surfaces of said cells and the adhesive-covered lower sheet section surface adheres to the lower major surfaces of said cells, thus forming a battery pack exhibiting a substantially I beam-like structure which provides significant structural integrity.

15. The method of claim 14 wherein said plastic sheet is fabricated from material from the group consisting of polycarbonate, polyester, vinyl and ABS plastic.

16. A method of manufacturing a battery pack from a plurality of flat cells, each cell including upper and lower major surfaces, said method comprising the steps of:
 situating said cells in side-by-side relationship to form a cell subassembly exhibiting a substantially uniform spacing between said cells, the upper surfaces of said cells being aligned in a common upper plane, the lower surfaces of said cells being aligned in a common lower plane;
 forming a layer of adhesive on a major surface of a plastic sheet which will be designated as the adhesive surface of said sheet;
 cutting said plastic sheet to a form that will substantially surround said cell subassembly when folded around said cell subassembly;
 embossing said sheet to form a plurality of creased fold lines in said sheet;
 folding said sheet at said fold lines to form an enclosure which will substantially surround said cell subassembly when said cell subassembly is situated therein, said layer of adhesive forming in said enclosure an adhesive-covered upper enclosure surface parallel with an adhesive-covered lower enclosure surface which face each other;
 placing said cell subassembly in said sheet and folding said sheet around said cell subassembly such that said adhesive-covered upper enclosure surface directly adheres to the upper major surfaces of said cells and the adhesive-covered lower enclosure surface adheres to the lower major surfaces of said cells, thus forming a battery pack exhibiting a substantially I beam-like structure which provides significant structural integrity.

17. The method of claim 16 wherein said plastic sheet is fabricated from material from the group consisting of polycarbonate, polyester, vinyl and ABS plastic.

18. The battery pack of claim 1 wherein the cell group includes first and second ends, said battery pack further comprising first and second substantially U-shaped plastic sheet end caps covering the first and second ends of the cell group, said first and second end caps each including a bottom portion having opposed ends and first and second substantially parallel side portions extending from the opposed ends of the bottom portion, the bottom portions of the end caps being adhesively coupled to the first and second ends, the first and second side portions of the end caps being adhesively coupled to a portion of the upper and lower surfaces of the cells, thus forming a cell group/end cap assembly.

19. The battery pack of claim 18 wherein the cell group/end cap assembly is situated within the plastic sheet enclosure.

20. A battery pack for a portable electronic apparatus, said battery pack comprising:
 a plurality of flat cells arranged in side-by-side relationship to form a cell group having a substantially uniform and substantially adhesive free intercell spacing therebetween, each cell having an upper and lower major surface, the upper surfaces of said cells being aligned in a common upper plane, the lower surfaces of said cells being aligned in a common lower plane, the cell group including opposed ends;
 a plastic sheet enclosure folded around said cell group to substantially surround said cell group to form a folded enclosure which opens onto the opposed ends of the cell group; said enclosure including an upper sheet surface parallel with a lower sheet surface;
 a first adhesive layer situated on said upper sheet surface and coupled to the upper surfaces of said cells;
 a second adhesive layer situated on said lower sheet surface and coupled to the lower surfaces of said cells thus forming an I-beam like structure which provides the structural integrity of said battery pack; and
 end pieces situated at the opposed ends of the cell group.

21. The battery pack of claim 20 further comprising a connective positioning sheet adhesively coupled to the upper surfaces of said cells to hold said cells spaced apart with a substantially uniform intercell spacing therebetween, said connective positioning sheet being situated between the cell group and one of the upper and lower sheet surfaces.

* * * * *